May 8, 1934.  L. A. GEBHARD  1,957,454
POWER OUTPUT INDICATOR FOR HIGH FREQUENCY APPARATUS
Filed June 21, 1933
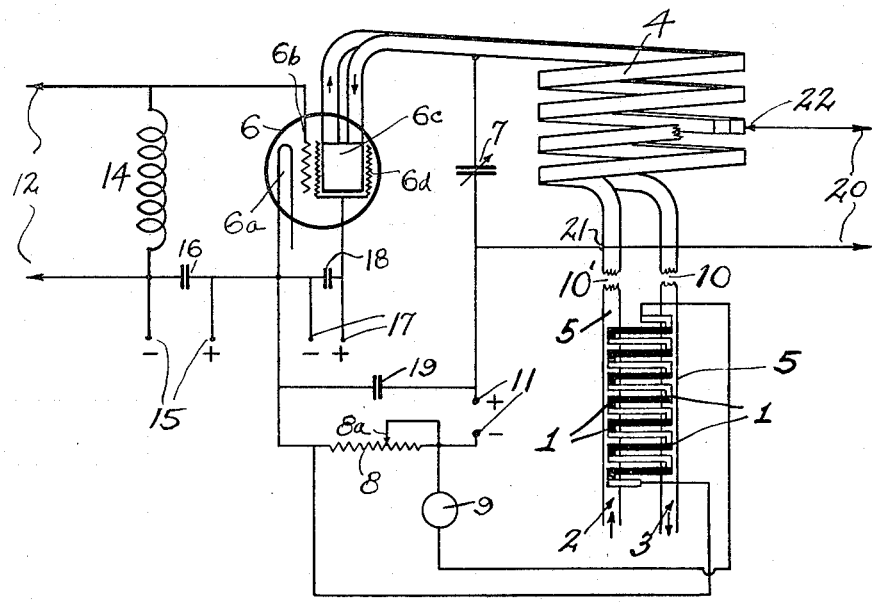
Inventor
L. A. GEBHARD
By Harold Dodd
Attorney Patented May 8, 1934

1,957,454

UNITED STATES PATENT OFFICE 1,957,454

POWER OUTPUT INDICATOR FOR HIGH FREQUENCY APPARATUS

Louis A. Gebhard, Washington, D. C.

Application June 21, 1933, Serial No. 676,949

8 Claims. (Cl. 171—95)

(Granted under the act of March 3, 1883, as amended April 30, 1928; 370 O. G. 757)

My invention relates broadly to high frequency signaling systems and more particularly to a method and apparatus for measuring the power output of high frequency signal transmitters.

One of the objects of my invention is to provide means for directly indicating the power output of a high frequency radio transmitter for facilitating the control of the output energy.

Still another object of my invention is to provide means for indicating the net power output of a radio transmitter by providing an electrical system which automatically effects a deduction of the losses from the power input for directly indicating the power output.

Still another object of my invention is to provide a circuit arrangement for thermo-electric means in the fluid cooling system of a high power electron tube transmitter by which a voltage proportional to the major power losses is obtained for operating an indicating meter adapted to directly show the power output of the transmitter.

A further object of my invention is to provide a circuit arrangement for a transmitter having means for deriving one potential drop which is proportional to the power input of the transmitter and another potential drop which is proportional to the major power losses both potential drops being pressed upon the same galvanometer with polarities such that the respective potential drops subtract, thus resulting in a potential drop which is proportional to the power output for directly indicating the power output by means of suitable calibrations on the galvanometer.

A still further object of my invention is to provide a circuit arrangement for a measuring instrument in circuit with a high frequency transmission system having means for subjecting the measuring instrument to the differential action of a voltage proportional to the power input and a voltage proportional to the major power losses for automatically determining the power output of the transmission system.

Other and further objects of my invention reside in the circuit arrangement for a measuring system as set forth more fully in the specification hereinafter following by reference to the accompanying drawing which diagrammatically shows the circuit arrangement of the measuring system of my invention in circuit with a high power electron tube system.

In my copending application Serial No. 676,948 filed June 21, 1933, I have set forth a method of measuring the losses in a high power electron tube system. My invention as set forth in said copending application is directed to an arrangement of a bank of thermocouples located in the cooling fluid circuit of a high power electron tube system and connected with a galvanometer. The galvanometer is calibrated to read power loss in the electron tube system. This reading varies with the temperature difference of the cool and hot junctions of the bank of thermocuples which are arranged in the inlet and outlet cooling fluid circuit. In the system of my invention set forth in the said copending application, in order to determine the power output of the system, it is necessary to determine the power input by voltmeter and ammeter readings and to subtract the losses from the said input power. My present invention provides means for determining the power output automatically and directly so that an operator is advised at all times as to the condition of operation of a radio transmitter equipped with the circuit of my invention. The operator is thus informed as to whether the radio transmitter is operating efficiently and properly.

Referring to the drawing, reference character 1 designates a bank of thermocouples having their junctions arranged in parallelly disposed conduits 5 forming paths for the cooling fluid in the cooling system of the high power tube 6. The high power tube 6 includes a cathode 6a, a control grid 6b, an anode 6c and a screen grid electrode 6d which I have represented schematically. The high power tube is arranged in electrical circuit with the inductance system 4 which is formed by a dual conductor having parallel extending passages for the circulation of cooling fluid around the jacket of anode 6c. The dual conductor forming the inductance system 4 has the ends thereof connected through hose coils which are interposed in the breaks indicated at 10 and 10' and connected with the conduits 5 so that a path for inlet cooling water is provided as represented schematically at 2 for circulation through one of the hollow conductors forming the dual passage inductance 4 to the jacket surrounding the anode at 6c and returning from the jacket surrounding anode 6c through the inductance 4, through the hose coil at the point 10, right hand conduit 5, to the discharge position indicated at 3. By reason of this arrangement the cool junctions of the bank of thermocouples 1 are located in the fluid inlet passage in the path of the cooling fluid entering at 2, while the hot junctions are located in the path of the cooling fluid discharged at 3. For a fixed flow of fluid the temperature rise is proportional to the losses of the anode plus those of the inductance 4 and the connections therebetween. The losses in the electrical condenser 7 which forms part of the tank circuit including inductance 4, the losses in insulation and other stray losses not accounted for in the temperature rise of the cooling liquid, can be corrected for in the calibration of the system since the total of these losses is fairly constant. In any event, the total percentage of these stray losses is low and does not seriously affect the value of the device in normal use.

An adjustable resistor 8 is placed in the plate circuit of the tube and connected in series with thermocouple bank 1 and galvanometer 9. The plate current flowing through resistor 8 causes a potential drop which is proportional to the current. If the source of plate potential 11 is held at a constant value as it would be in a radio transmitter if certain precautions were taken, then the potential drop across resistance 8 is proportional to the power input to the anode. Resistor 8 and thermocouple bank 1 are so connected that the potential drops subtract so that the deflection of galvanometer 9 is proportional to the difference of these potential drops and therefore proportional to the difference between the power input and losses which is the power output. The galvanometer 9 may be calibrated to read directly in watt or kilowatt power output. In the calibration of the galvanometer, a correction can be made so as to include the stray losses. In general, the stray losses amount to approximately 5% of the power input to the anode. Resistor 8 is made adjustable by means of tap 8a so that the potential drop across it can be adjusted to the proper value for a given current.

I have indicated the system of my invention as applied to a high frequency amplifier circuit. It is clear however that the invention is equally applicable to oscillation systems or balanced amplifier circuits for electron tube systems used in carrier current line wire transmission circuits. The amplifier circuit shown in the drawing is provided with input terminals 12 connected through coupling inductance 14 with the input of electron tube 6 across control grid 6b and cathode 6a. A suitable source of biasing potential such as a rectified alternating current system, a direct current generator system or battery, is connected to terminals 15 with bypass condenser 16 connected in shunt therewith. The screen grid 6d may be suitably energized from a source of potential such as a rectified alternating current system, a direct current generator system or battery, connected at terminals 17 across which bypass condenser 18 is connected. The source of plate potential such as a rectified alternating current system, a direct current generator system or battery, which is connected to terminals 11 is also shunted by a bypass condenser 19 extending across both the plate potential source as well as the resistance 8 in series. The output terminals for the electron tube system have been represented at 20 connected to one end of the inductance 4 as shown at 21 and to an adjustable tap 22 along the inductance.

The differential effect obtained between the potential drop developed across resistor 8 and the potential drop derived from the bank of thermocouples 1, is directly applied to the galvanometer 9 for automatically and directly providing a reading of power output.

While I have described my invention in one of its preferred embodiments, I desire that it be understood that modifications may be made and that no limitations upon my invention are intended other than are imposed by the scope of the appended claims.

The invention herein described may be manufactured and used by or for the Government of the United States of America for governmental purposes without the payment of any royalty thereon or therefor.

What I claim as new and desire to secure by Letters Patent of the United States is as follows:

1. In the output circuit of a liquid cooled high power electron tube in a radio transmitter, an inductance formed of the conducting tubes which carry the cooling liquid, a thermal battery, the cold junctions of said thermal battery immersed in the cooling input liquid, the hot junctions of said thermal battery immersed in the heated output liquid, a galvanometer, a variable resistance element connected in the anode circuit of said electron tube and also in series with said thermal battery and said galvanometer.

2. In the output circuit of a liquid cooled high power electron tube in a radio transmitter, an inductance formed of the conducting tubes which carry the cooling liquid, a thermal battery, the cold junctions of said thermal battery disposed in the cool inflowing liquid, the hot junctions of said thermal battery disposed in the outflowing heated liquid, a galvanometer, a variable resistance element connected in the anode circuit of said electron tube, said variable resistance also connected in series with said thermal battery and said galvanometer, means by which the potential difference impressed across said variable resistance from said thermal battery will be opposite in polarity to the potential drop across said variable resistance due to the anode current.

3. In the output circuit of a radio transmitter, means for deriving a first potential difference proportional to the power output, means for deriving a second potential difference proportional to the losses in said output circuit, a galvanometer, connecting means for algebraically combining said potential differences with opposite polarities, and means for impressing said combined potential differences on said galvanometer.

4. In the output circuit of a radio transmitter, means for deriving a first voltage proportional to the power output, means for deriving a second voltage proportional to the losses in said output circuit, a galvanometer, connecting means for obtaining the difference of potential between the said two voltages, and means for impressing said difference of potential on said galvanometer.

5. A power output indicator for high frequency apparatus which includes a high power electron tube having a fluid cooled anode system, the combination of means for generating a difference of potential dependent upon the difference of temperatures of the cooling fluid in the cooled anode system, means for deriving a potential difference proportional to the power supplied to the anode of said electron tube, and an indicating meter for determining the combined effects of said potential differences.

6. A power output indicator for high frequency apparatus including an electron tube having a fluid cooled anode system, a circulatory system for cooling fluid including inlet and discharge connections, a thermal battery having a plurality of junctions electrically connected in series, one group of said junctions included in said fluid inlet connection, another group of said junctions included in said fluid discharge connection, a resistor connected in series with the anode circuit of said electron tube, an indicating meter, and a series circuit including said resistor, said indicating meter, and said thermal battery for measuring on said indicating meter the difference of potential between the voltage generated by said thermal battery and the voltage set up across said resistor.

7. The method of measuring power output in a high frequency transmission circuit which includes a fluid cooled anode system for an electron tube having fluid inlet and discharge connections, an output circuit and a high voltage source therefor, said method consisting in deriving a voltage dependent upon the difference in temperature in the cooling fluid at the fluid inlet and discharge connections, deriving a voltage proportional to the power input to the anode and determining the differences of the said voltages.

8. A power output indicator for high frequency apparatus which includes an electron tube system having an anode cooling system, an output circuit and a fluid cooled inductance therein, fluid inlet and discharge connections leading to said inductance and to said fluid cooled anode, a thermal battery having junctions electrically connected in series, one group of said junctions disposed in the fluid inlet connection and another group of said junctions disposed in said fluid outlet connection, an output circuit including a high voltage source for the anode of said electron tube, a resistor electrically connected in series with said output circuit, an indicating meter, and a closed circuit including said resistor, said thermal battery and said indicating meter for impressing upon said indicating meter the difference in potential between the voltage derived from said resistor and the voltage generated by said thermal battery for directly determining the power output of said electron tube system.

LOUIS A. GEBHARD.